Figure 1:
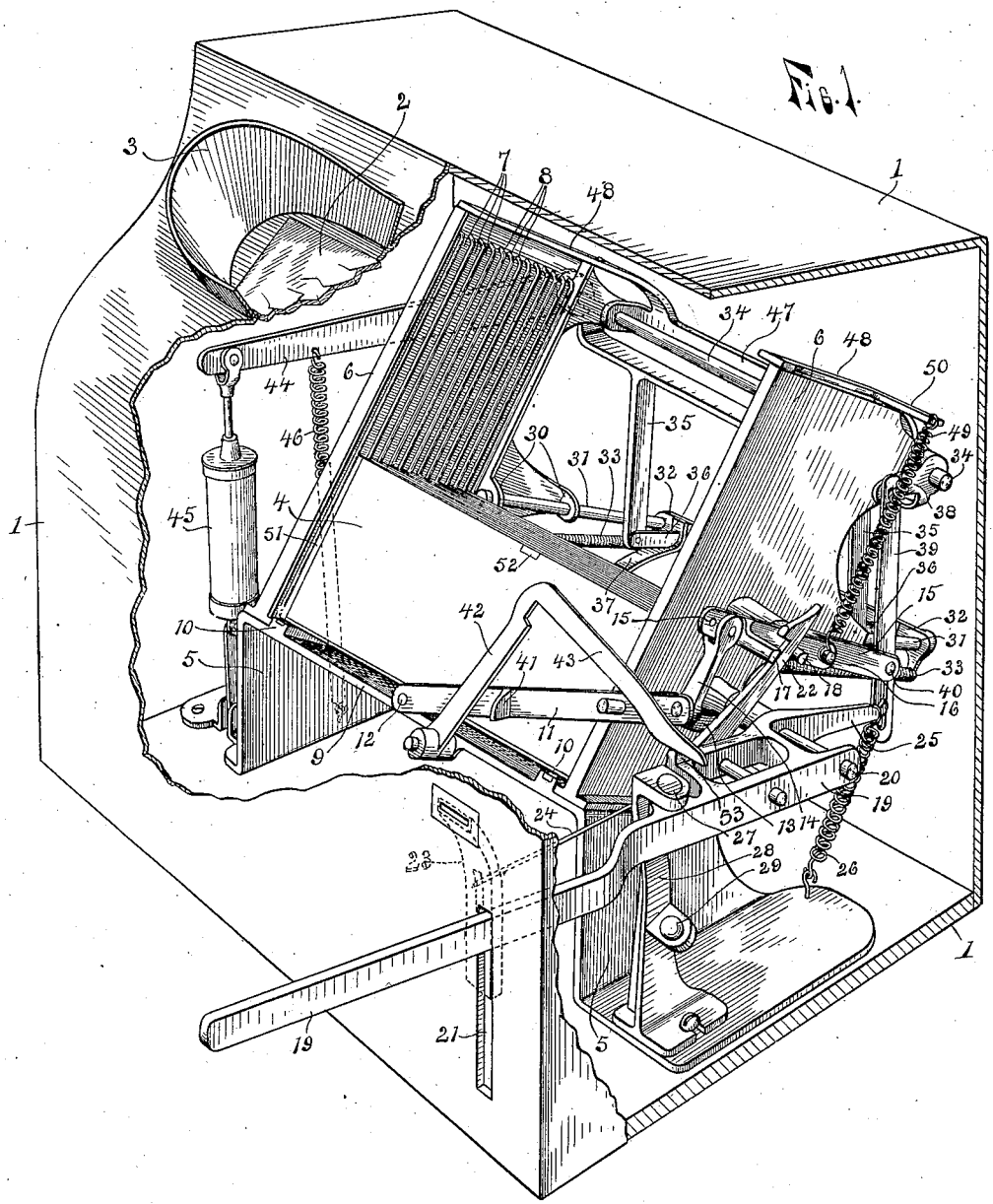

No. 845,052. PATENTED FEB. 26, 1907.
A. A. CAILLE.
PICTURE EXHIBITOR.
APPLICATION FILED FEB. 11, 1905.

2 SHEETS—SHEET 1.

WITNESSES.

INVENTOR.

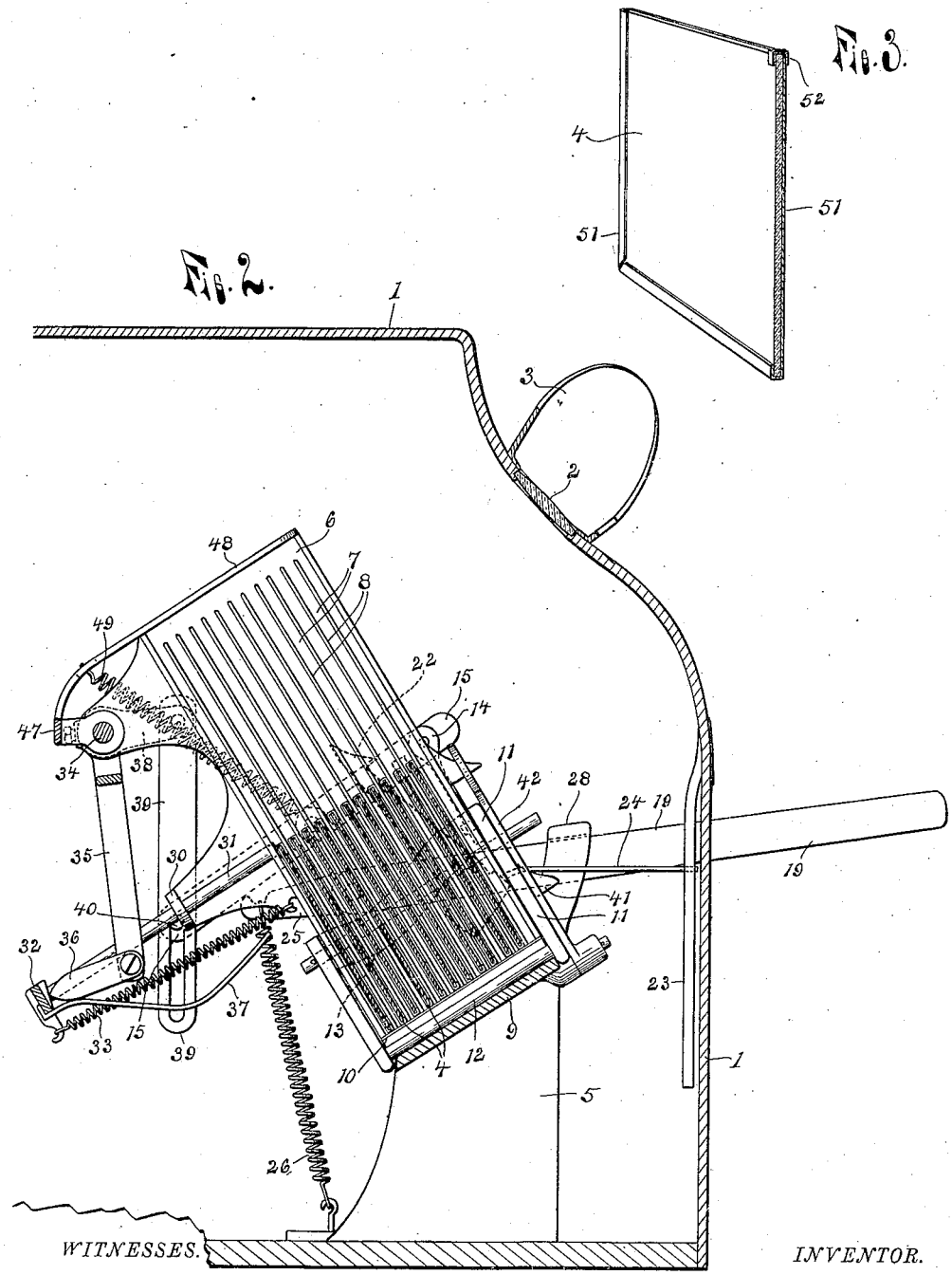

UNITED STATES PATENT OFFICE.

AUGUSTE A. CAILLE, OF DETROIT, MICHIGAN.

PICTURE-EXHIBITOR.

No. 845,052.  Specification of Letters Patent.  Patented Feb. 26, 1907.

Application filed February 11, 1905. Serial No. 245,315.

*To all whom it may concern:*

Be it known that I, AUGUSTE A. CAILLE, a citizen of the United States of America, residing at Detroit, in the county of Wayne and State of Michigan, have invented certain new and useful Improvements in Picture-Exhibitors, of which the following is a specification, reference being had therein to the accompanying drawings.

This invention relates to improvements in machines for automatically exhibiting a series of pictures one after another in rapid succession; and its object is to provide a simple, cheap, and efficient device for the purpose which operates to present the pictures in a new and novel manner and is so constructed that the pictures may be quickly and easily removed and others inserted and also so that the pictures are effectually protected from injury or wear.

To this end the invention consists in providing a series of pictures with a metal backing to protect and give the same weight and in constructing a supporting-frame with suitable vertically-extending guides to receive the ends of the pictures and within which they are simultaneously lifted by suitable lever mechanism and held by movable supports until said supports are gradually withdrawn, allowing the pictures to drop one at a time by their own gravity.

The invention also consists in providing the suitable lever mechanism and the particular construction, arrangement, and combination of parts, all as hereinafter more fully described, and shown in the accompanying drawings, in which—

Figure 1 is a perspective view of a device embodying the invention, showing the casing broken away to disclose the mechanism. Fig. 2 is a transverse vertical section of the same; and Fig. 3 is an enlarged perspective view of one of the pictures, showing the same in section.

As shown in the drawings, 1 is a casing, of any desired form or construction, provided with openings in which are secured lenses 2 and surrounded by a shield or flange 3, thus forming a stereoscope through which the operator may view the stereoscopic pictures 4 within.

A frame 5, having upwardly-extending inclined end walls 6, is secured within the casing to its bottom, and on the inner face of each wall are parallel guides or ways 7, formed by wires 8, which are bent at right angles at their upper ends and secured in openings in the wall, the walls being just far enough apart to allow the pictures to freely slide between, with their ends between the wires. The base portion of the frame is formed with a transverse shelf 9, extending across the frame at the lower ends of the walls 6, and on this supporting-shelf are secured buffers 10, consisting of strips of rubber or other suitable material secured in grooves in the shelf, upon which buffers the pictures normally rest in the lower ends of their guides 7.

The pictures are simultaneously raised to the upper ends of the guides and in the line of vision of the operator looking through the lenses by a yoke consisting of rocking levers 11, pivoted intermediate their ends in bearings on one of the walls 6 and connected to each other at one end beneath the pictures by a rod 12 and near their opposite ends outside the wall by an integral cross-bar 13. A link 14 is pivotally attached at one end to one of the levers 11 and at its opposite end to one end of a bar 15, pivoted intermediate its ends on a stud 16 on the outer side of said wall, said bar being provided with outwardly-extending arms 17 and 18 between its pivot and the point of attachment of the link. An operating-lever 19 is pivoted at one end on a stud 20, extending outward from the wall below the stud 16, and extends out through a slot 21 in the front of the casing, where it may be grasped by the operator and moved to operate the machine, a weighted hook 22 being pivoted to said operating-lever to connect the same with the bar 15, which hook extends upward between the arms 17 and 18 in position to hook onto the arm 17 upon the downward movement of said lever, when the hook is thrown forward by the weight of a coin which is inserted in the coin-chute 23 and which engages the end of a wire 24, extending outward from the hook 22 into a slot in the chute. An arm 25 on the operating-lever extends rearwardly beyond the pivot of said lever, and a coiled spring 26, attached at one end to said arm and at its opposite end to the frame, normally holds the projecting end or handle of the lever raised and in engagement with a buffer 27 on a post 28, a similar buffer 29 being provided below the lever on said post to limit the downward movement thereof.

On the walls 6, at the rear of the guides or ways 7, are inwardly-projecting ears forming bearings 30, within which the rods 31 are longitudinally movable, said rods extending at right angles to the said guides and adapted to be projected across the same when the pictures are raised above their inner ends. The rear ends of these rods are secured to a bar 32, and coiled springs 33, attached at one end to said bar and at the opposite end to the frame, exert a force to move the rods longitudinally inward, and to move said rods in the opposite direction across the guides from beneath the pictures a rock-shaft 34, mounted in bearings on the upper ends of the walls and at the rear sides thereof, is provided with downwardly-extending arms 35, to the lower ends of each of which is pivotally attached push-bars 36, adapted to engage the cross-bar 32 at their free ends and to slide upon curved tracks 37, secured to and extending inward from said bar. The rock-shaft is rocked when the operating-lever is depressed by providing said shaft with a short arm 38 and connecting the free end of said arm with the rear end of the bar 15 by a link-bar 39, which is pivotally attached at one end to said arm and at its opposite end to the bar 15 by a pin 40 on said bar engaging a slot in the link-bar. When the forward end of bar 15 is rocked downward by the hook, its rear end moves upward, engaging the pin with the upper end of the slot in the link-bar, and this turns the rock-shaft, moving the push-bars out of engagement with the cross-bar 34, said cross-bar being held from being moved inward by its springs 33 by the engagement of the forward ends of the rods 31 with the back of the rearmost picture. The same movement of the operating-lever which turns the rock-shaft also lifts all of the pictures, and therefore when the arms 35 reach the end of their inward movement the pictures have been lifted above the said rods 31, which are at once moved longitudinally beneath the pictures by the springs 33 to support the same.

Extending outward from the forward side of the forward rocking lever of the lifting-yoke is a lug 41, adapted to be engaged when the yoke has fully raised the pictures with a notch in a gravity-latch 42, pivoted to the forward edge of the shaft 9 to hold the yoke in this raised position during the return or upward movement of the operating-lever, so that the hook 22 will be disengaged from its arm 17 by said movement, and to release the yoke the latch is provided with a long arm 43, extending over the operating-lever in position to be engaged by an upwardly-projecting lug 53 on said lever just before the same reaches the upper end of its stroke and to be lifted by such engagement, thus turning the latch on its pivot from engagement with the lug on the yoke, which being free will at once fall, leaving the pictures supported by the rods 31 only. In the position of the parts as shown in Fig. 1 the operating-lever is at the extreme upper end of its stroke, and the arm 43 is shown in engagement with the lug 53 on said lever and supported thereby.

To gradually withdraw the rods 31 from beneath the pictures to allow the same to drop one at a time, a long lever 44 is secured to the rock-shaft 34, and to its free end is pivotally attached one end of the piston-rod of an ordinary dash-pot 45, the lower end of which dash-pot is pivotally attached to the frame. A spring 46 is attached at one end to said lever and at its opposite end to the frame to pull the lever down, said spring being strong enough to overcome the action of the springs 33, but is retarded in its action by the dash-pot, so that the rock-shaft is gradually turned, the push-bars 36 engaging the cross-bar 32 and gradually forcing the same rearwardly as soon as the yoke is released by the latch 42. The slot in the link-bar 39 permits the lifting-yoke to drop as soon as released by the latch, the pin 40 moving down in the slot, and therefore the yoke does not interfere with the free dropping of the pictures.

To prevent the pictures from being driven out of the upper ends of their guides when the machine is operated quickly, a bar 47 is pivoted upon the rock-shaft 34 and provided with forwardly-extending arms 48, engaging the upper ends of the walls 6. A coiled spring 49 is attached at one end to an arm 50, extending laterally from one of said arms at a distance from the shaft to hold the arms in engagement with the walls. When it is desired to take out or insert pictures, the bar is turned on the shaft until the spring passes the center of said shaft, the arms thus being held out of contact with the walls by the spring.

Each of the cardboard pictures 4 is provided with a back 51 of tin or other suitable material which is bent around the ends and bottom thereof, forming a holder to protect the picture and form a metal contact with the guides, so that it will slide easily therein, and also to give weight to the pictures, so that they will fall quickly. A clip 52 over the upper edge of the picture and back holds the picture in the holder and permits its ready removal therefrom.

The hook 22 is normally held by gravity in contact with the stop-arm 18; but when the operator drops a coin into the chute it falls upon the end of the wire 24, and its weight throws the hook forward into engagement with the arm 17, thus connecting the operating-lever to the bar 15, so that when said lever is depressed the lifting-yoke will be turned on its pivot to raise the pictures, and at the same time the rock-shaft will be turned, putting the spring 46 under tension and moving the push-bars 36 out of contact with the cross-bar 32, thus leaving the springs 33 free to act upon said bar to project the rods 31 beneath the pictures as soon as they are raised above the ends of said rods.

In order to get the lifting-yoke out of the way, so that the pictures may fall freely upon the buffers 10 as the rods 31 are withdrawn, the latch 42 is provided, which engages the yoke when the same reaches the upper end of its stroke and holds it there during the return or up movement of the operating-lever. Upon this upward movement of the operating-lever the arm 17, being held in the position in which it then is, said arm and the hook separate and the hook at once falls by its own gravity back against the stop 18, the coin having been allowed to pass on down the chute by the withdrawal of the wire therefrom during the downward movement of said operating-lever. The lever is thus disconnected from the other parts, so that when it engages the arm 43 of the latch and releases the same the yoke is free to fall into its normal or the position shown in Fig. 1. The return movement of the rock-shaft, which movement is caused by the spring 46, is, however, retarded by the dash-pot, thus retarding the downward movement of the link-bar 39 also, and therefore in order that there may be a free movement of the bar 15 relative to the link-bar to allow the yoke to fall freely the pin-and-slot connection between said bar and link is provided.

It is evident that if the yoke was not held in its raised position after being so raised by the downward movement of the operating-handle it would fall as said handle was raised, the hook 22 remaining in engagement with the lug 17, and if said handle was raised with a slow motion the downward movement of the yoke would be correspondingly slow, and it would not be fully lowered before the pictures began to drop. This holding of the yoke in its raised position also prevents, through the medium of the link 14, bar 15, link-bar 39, and short arm 38, the spring 46 from operating to withdraw the rods 31 from beneath the pictures, and therefore they are held in their raised position until the yoke is fully lowered out of the way, so that they may fall freely when the rods are withdrawn.

Having thus fully described my machine, what I claim is—

1. In a picture-exhibitor, the combination with the supporting-frame, of a series of independent pictures, upwardly-extending guides on the frame for said pictures, means for raising the pictures simultaneously in said guides, supports adapted to be projected across the guides beneath the pictures to support the pictures in their raised position, and means for withdrawing the supports from beneath the pictures to allow the same to fall in their guides, one at a time.

2. In a picture-exhibitor, the combination with the supporting-frame, of a series of independently-movable pictures, upwardly-extending guides on the frame for said pictures, means for raising the pictures in the guides, longitudinally-movable rods adapted to be projected across the lower edges of the pictures when the same are raised, and means for retracting the rods from beneath the pictures to permit the same to fall, one at a time.

3. In a picture-exhibitor, the combination with the supporting-frame and upwardly-extending guides on said frame, of a series of independently-movable pictures in said guides, means extending across the lower edges of the pictures to engage and lift the same in the guides, means for holding the pictures in their raised positions and releasing the same one at a time, an operating-lever for actuating the lifting means, and means connecting said lever and lifting means adapted to disengage the said means when the pictures have been fully lifted to permit the same to fall independently of the lever.

4. In a picture-exhibitor, the combination with the supporting-frame, of a series of independent pictures, upwardly-extending guides on the frame to receive the ends of said pictures, an operating-lever, lifting mechanism engaging the under side of the pictures and to raise the same in said guides, longitudinally-movable rods adapted to be projected across the guides below the pictures when said pictures are raised to the upper ends of the guides, means connecting said operating-lever and lifting mechanism adapted to disconnect the same to allow the mechanism to fall away from the pictures when they are engaged by the rods, and means for withdrawing the rods from beneath the pictures to allow the same to fall, one at a time.

5. In a picture-exhibitor, the combination with a supporting-frame, of a series of independent pictures, upwardly-extending guides for said pictures, lever mechanism for raising the pictures in said guides, supporting-rods longitudinally movable in bearings on the frame to project across the guides beneath the pictures when the same are raised, springs to project said rods, means for withdrawing the rods from across the guides operated in one direction by said lever mechanism, a spring to operate said means in the other direction, and a means for retarding the operation of the last-named spring.

6. In a picture-exhibitor, the combination with a supporting-frame, of a series of independently-movable pictures, guides for said pictures, a yoke pivoted on the frame and extending beneath the pictures to raise the same, means to engage the yoke and hold the same in its raised position, an operating-lever adapted to engage said means to release the yoke, a gravity-hook carried by the lever to engage the yoke, means for turning the hook into engagement with the yoke, and means for holding the pictures in the upper ends of the guides and releasing the same, one at a time.

7. In a picture-exhibitor, the combination with a supporting-frame, of a series of independent pictures, guides on the frame for said pictures, a yoke pivoted on the frame and extending beneath the pictures to engage and raise the same, a latch to engage and hold the yoke in its raised position, an operating-lever adapted to engage and release the latch, a hook carried by the said lever to connect the same to the yoke, supporting-rods, springs to project the rods beneath the pictures, a spring to withdraw the rods from beneath the pictures, and a dash-pot to retard the action of the last-named spring.

8. In a picture-exhibitor, the combination with a frame, of a series of independent pictures, guides on the frame for said pictures, a yoke pivoted on the frame and adapted to engage and lift the pictures, an operating-lever, means connecting the yoke and lever, a rock-shaft mounted in bearings on the frame, longitudinally-movable rods adapted to be projected across the guides beneath the pictures to support the same in their raised position, springs to so project said rods, arms on said rock-shaft to move the rods in the opposite direction, a lever to turn the rock-shaft, a spring to operate the lever in one direction, means for turning the rock-shaft against the action of said spring operated by the operating-lever, and a dash-pot to retard the action of said spring.

9. In a picture-exhibitor, the combination with a casing provided with openings having lenses therein, of a supporting-frame within the casing, upwardly-extending guides on the frame, a series of pictures movable in said guides, a yoke pivoted on the frame and extending beneath the pictures to raise the same in said guides into position opposite the lenses, an operating-lever pivoted on the frame and extending through a slot in the casing, a bar pivoted intermediate its ends on the frame, a hook pivoted to the operating-lever and normally held by gravity out of connection with one end of said bar, means for moving said hook into engagement with said bar, supporting-rods longitudinally movable in bearings on the frame to engage the lower edges of the pictures when said pictures are raised, springs to move the rods beneath the pictures, a connecting-bar connecting said rods at their rear ends, a rock-shaft mounted in bearings on the frame, arms on the rock-shaft to engage the cross-bar and move the rods from beneath the pictures, an arm on the rock-shaft, a link-bar pivotally secured to one end of said arm and provided with a slot, a pin on one end of the bar pivoted on the frame to engage said slot, a lever on the opposite end of said rock-shaft, a spring attached to said lever to turn the rock-shaft, and a dash-pot attached to said lever to retard the action of said spring.

10. In a picture-exhibitor, the combination with a casing having openings provided with lenses, of a supporting-frame within the casing provided with upwardly-extending inclined walls, guides on said walls, a series of pictures engaging said guides at their ends, a yoke pivoted to one wall and extending beneath the pictures, a bar pivoted intermediate its ends on said wall, a link connecting one end of said bar to said yoke, arms extending outward from the bar near said end, an operating-lever pivoted to the frame and extending outward through a slot in the casing, a spring to hold said lever raised, a hook pivoted to said lever and extending upward between said arms, means for securing the hook into engagement with one arm to operate the bar, a gravity-latch to engage and hold the yoke in its raised position, an arm on said latch adapted to be engaged by the operating-lever to release the latch, a rock-shaft mounted in bearings on the frame, an arm on said rock-shaft, a link-bar pivoted to said arm and provided with a slot, a pin on the rear end of the bar pivoted to the wall to engage said slot, bearings on the rear of said walls, rods movable longitudinally in said bearings across the guides, a cross-bar connecting the rear ends of said rods, springs to move said rods in one direction, downwardly-extending arms on the rock-shaft, push-bars on the lower ends of said arms to engage the cross-bar, curved tracks for said push-bars secured to the cross-bar, a lever secured to said rock-shaft, a spring to actuate said lever in one direction, a dash-pot to retard the movement of said lever, and arms pivoted on the rock-shaft and extending over the pictures at the upper ends of the walls to form stops to prevent the pictures from escaping from said guides.

In testimony whereof I affix my signature in presence of two witnesses.

AUGUSTE A. CAILLE.

Witnesses:
 GUY HAMILTON,
 BLANCHE A. DAVIS.